Sept. 25, 1962 M. BOURGEAUX 3,055,052
APPARATUS FOR DRAWING UNIFORM FIBERS OF THERMOPLASTIC MATERIALS
Filed May 1, 1959 2 Sheets-Sheet 1
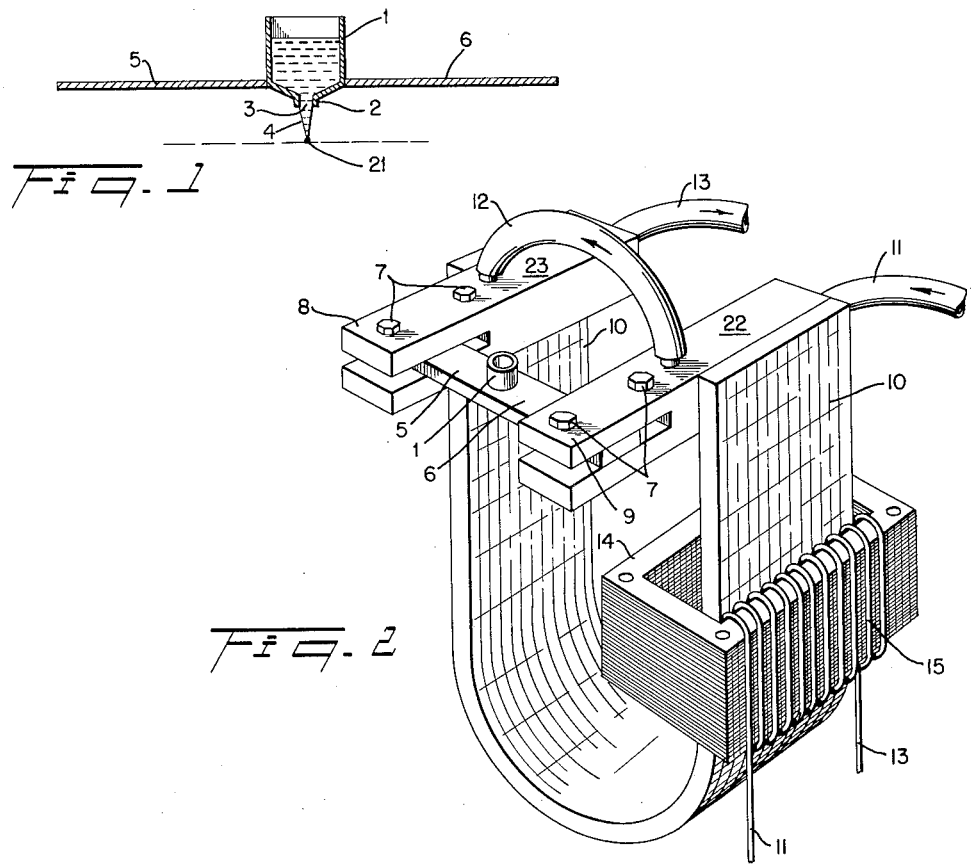
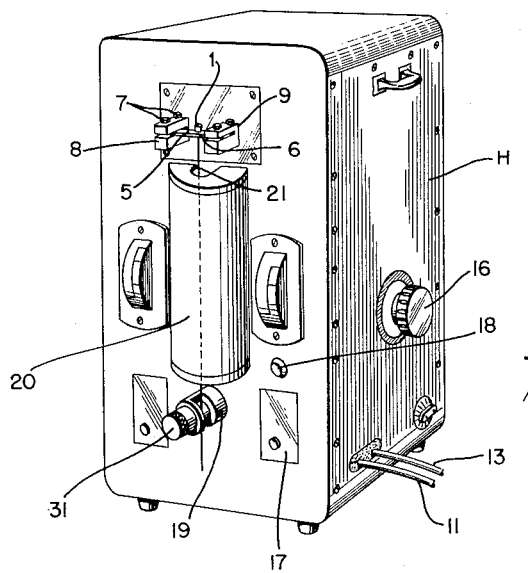
INVENTOR.
Maurice Bourgeaux
BY
Bauer and Seymour
ATTORNEYS

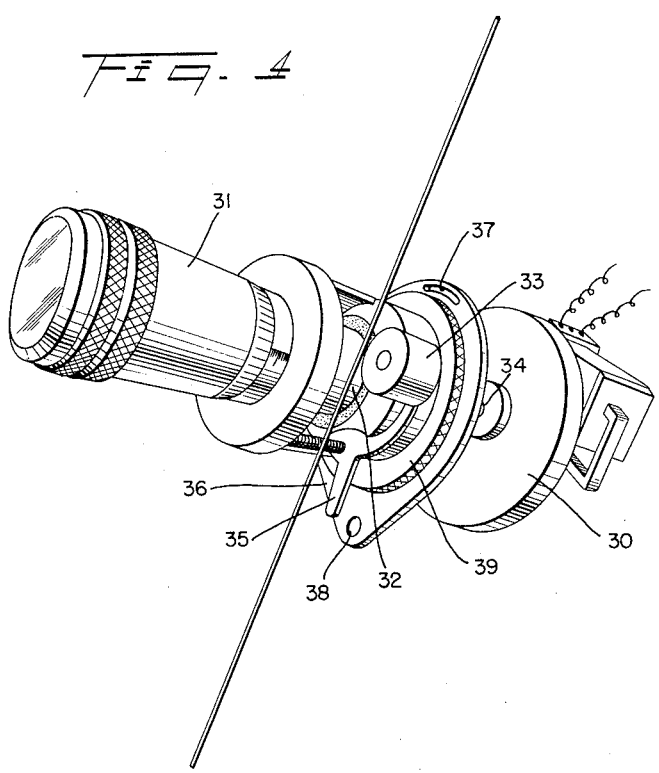
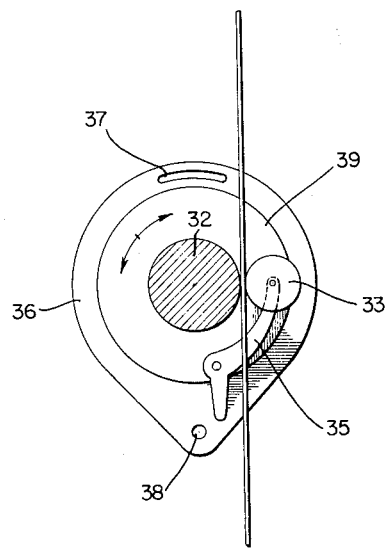

United States Patent Office 3,055,052
Patented Sept. 25, 1962

3,055,052
APPARATUS FOR DRAWING UNIFORM FIBERS
OF THERMOPLASTIC MATERIALS
Maurice Bourgeaux, Paris, France, assignor to Compagnie de Saint-Gobain, Paris, France
Filed May 1, 1959, Ser. No. 810,510
Claims priority, application France May 9, 1958
12 Claims. (Cl. 18—8)

This invention relates to the production of thermoplastic fibers of uniform size. The invention involves an apparatus. It is applicable to all thermoplastic materials which have sufficient tenacity to be drawn into fibers, but it has particular advantages in preparing glass fibers for use in determining the physical and chemical characteristics of the glass. A particular use of the apparatus is in preparing test samples for use in determining the softening point of glass compositions, the standards for which are found in "A.S.T.M. Standards of Glass and Glass Products" American Society for Testing Materials 1950, page 382, which requires that the tests be carried out on glass fibers of specific dimensions under closely controlled conditions. As this apparatus is efficient in producing such test samples, the description will be generally directed to the production thereof, but it is to be understood that this is simply an example.

An ordinary method of making viscosity determinations such as the softening point of glass is to use test samples having a circular and unvarying section which is between 52 and 70 hundredths of a millimeter, which has a length of at least 23 cm., and is homogeneous and bubble free. It is very difficult to obtain such test pieces by known methods, and it is an object of this invention to prepare them.

The characteristics of the glass have no effect upon the utility of the present apparatus because it is adapted to prepare uniform test pieces, and uniform fibers regardless of the composition of the thermoplastic material. Furthermore, it is adapted to produce uniform fibers of selected diameter.

It is an object of the invention to prepare uniform fibers of preselected diameter and to readily produce fibers of different diameter by control of the temperature of the glass and drawing speed of the apparatus.

The objects of the invention as to apparatus are accomplished generally speaking by an apparatus which involves a small crucible for the fusion of the glass, which is electrically heated by a circuit of accurately controllable power so that by this accurate control of power there is achieved an accurate control of temperature; means for drawing the molten thermoplastic at low and constant speed, this means being provided with accurate and widely variable speed control which may be used to provide very gradual and progressive changes in speed. This accurate speed control in combination with the accurate heat control can be used to produce fibers of selected and uniform diameters; the apparatus has means for accurately centering the point of traction, that is to say the point at which the tractive effort is applied to draw the fiber, so that it is accurately aligned on the axis of the nozzle of the crucible through which the drawing takes place; the drawn fiber is shielded from too rapid and uneven loss of heat during the drawing.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical sectional view through the crucible and its heating means forming part of an apparatus according to the invention;

FIG. 2 is a perspective view of the heating apparatus;

FIG. 3 is a perspective view of an apparatus according to the invention showing the drawing of a thermoplastic fiber;

FIG. 4 is an enlarged, perspective, schematic detail of the drawing means and

FIG. 5 is a front view of the support plate.

The general operation of the apparatus can best be studied in connection with FIG. 3 wherein H indicates a housing which encloses the major part of the heating and control elements, 1 indicates a crucible supported in its heating elements 5, 6 from which a fiber 21 is being drawn by the drawing mechanism 19. The miniature crucible 1 has received and has melted the glass which is to be made into a test fiber, and, through a bottom nozzle 2, the mechanism 19 is drawing the fiber to uniform and predetermined diameter. A shield 20 of some transparent material either glass or plastic protects the length of the fiber against uneven dissipation of its heat. The shield 20 is hinged at one edge so that it can be swung away from the fiber if desired. Power lines 11, 13 deliver current to the heating mechanism inside the housing and the power applied is accurately controlled by the knob 16. The mechanism of control for the accurate control of power is well known in electrical engineering and needs no description in this specification. An ammeter $a$ and a voltmeter $v$ inform the operator of the applied current characteristics. The usual switches and warning lights 17, 18 protect the apparatus against irregularities in current supply. While the control of current is accurate and widely variable, it does not in itself have any novel features.

The heating apparatus is shown in FIG. 2 and this has notable features of novelty. The power lines 11, 13 deliver current to the primary 15 of a transformer having an armature 14 and a single loop secondary 10, 22, 6, 5, 23. This loop is composed of U-shaped copper strip 10 to which forked copper blocks 22, 23 are attached. The fork 8, 9 of the copper blocks receive between them a platinum bar 5, 6 having a centrally located orifice in which the crucible 1 is mounted and soldered. The material used in the construction of the crucible should be as resistant to attack as possible and platinum is generally recommended although other materials may be used when the thermoplastic to be drawn is not corrosive at the temperature of drawing. The resistance of the platinum is about six times that of the copper portion of the secondary of the transformer which has the effect of concentrating the heat generated at the crucible. The copper blocks 22, 23 may, in addition, be cooled by a water supply 11, 12, 13 if desired. This is not always necessary, but it provides an additional means of maintaining an accurately selected temperature in the crucible. The crucible is provided in its bottom with a downwardly directed spout 2 which is calibrated and accurately fitted to size as to be perfectly circular. The discharge port 3 of this spout is machined so as to lie in a plane which is perfectly horizontal. The orifice itself is of such size that, when the thermoplastic is at drawing temperature, the thermoplastic does not run out of, but has to be drawn as for instance by applying a cold glass rod to it and drawing the fiber forth from the spout. By this construction, the crucible and its contents are maintainable uniformly at an accurately selected temperature. The cooling of the secondary assists in the maintenance of that temperature and at the same time prevents variation in the characteristics in the secondary from arising by virtue of alterations in temperatrue of the metal of the secondary.

The drawing mechanism is also by itself, and in combination with the heating mechanism, endowed with elements of novelty which are diagrammatically displayed in FIG. 4. An electric motor 30 of constant speed type, which may be and desirably is of synchronous type, drives a shaft 34 which may be regarded as one of the aligned shafts in a speed changing mechanism such as is described in French patent identified as Acloque 992,167, delivered July 4, 1951. Motor shaft 34 drives a drawing roller 32 which is coated with rubber or other plastic material. A lever 35 supports at one end a cooperating roller 33 which is spring-biased toward roller 32. The rollers 32, 33 grip the fiber 21 between them and the motor 30 drives them to draw the fiber. The synchronous motor and the speed control mechanism, which can be varied by turning the knob 31, cooperate to draw the fiber at whatever speed the operator desires. The speed provided by the motor and the speed reduction gear can be made to provide various speeds of drawing, but in general, in drawing glass, speeds on the order of a millimeter per second are adequate. Speed control devices of this sort have various limits to the speed range to which they cover, but a maximum variation of 8 is sufficient for all ordinary drawing.

A support-plate (36) articulated on the front of the speed control mechanism is able to turn about axis 38 of a small angle on both sides of a middle position and can be fixed in the selected position by means of a screw passing through stud-hole 37. In orienting conveniently the plate 36 it is possible to place the right generating line of the drawing roller 32 straight below the discharge nozzle 3 that is to say aligned on the direction of the nozzle axis. This setting being achieved it is possible to obtain a rotation of the drawing system itself around its general axis by means of the milled rim 39 that permits to place the centers line 0—0' of the rollers 32 and 33 perpendicular to the discharge nozzle axis.

It is obvious that this second setting has not any influence on the first setting and that the right generating line of the drawing roller remains on the axis of the discharge port.

The operation of the device is as follows:

The crucible, which is ordinarily of a capacity of about 3 cc. is loaded with granules or small lumps of a glass or some other thermoplastic that is to be tested. The crucible must, of course be perfectly clean; cleaning can be accomplished by melting all the residue from a prior operation and cleaning with hydrofluoric acid. The number or size of the particles in the crucible is without importance. Ordinarily it is sufficient to fill it three quarters full. If the original estimate was incorrect, additional particles can be added to obtain the desired level. Because the crucible has little height, there is no great difference of hydrostatic pressure between the different points on the crucible wall. Nevertheless, during the course of drawing, the level of the glass is constantly reduced, and all other factors remaining the same, the diameter of the fiber drawn tends to diminish slightly and progressively during the drawing. However, this is of little importance because the useful length of the fibers employed in testing is on the order of 20 cm. and the amount of glass employed in making a fiber of that length is so small, assuming about 1 mm. diameter, that the level of glass in the crucible does not appreciably change.

To melt the glass lumps in the crucible the operator activates the primary of the transformer by means of a switch 17, the primary activates the secondary, and the little crucible is carried in a few seconds to a convenient melting temperature which is, for glass in general, somewhere between 1200 and 1500° C. Special glasses melt at other temperatures and thermoplastics of organic sorts at yet different temperatures, but the apparatus is sufficiently flexible to handle all such cases.

The substance having been melted in the crucible, there is no outflow because of the small size of the spout and capillarity. Usually the temperature of the crucible is raised above that at which the drawing is practiced. Vitreous articles do not have a critical melting point, but tend to enter into ranges of viscosity which are of considerable width. Thus, they assume a condition of increasing pastiness as the temperature rises which is favorable to the practice of slow drawing. The temperature most favorable to drawing the particular thermoplastic is attained by regulating the current by means of the knob 16 which controls the variable transformer. The amount of power useful in melting most glasses is in the neighborhood of 500–1000 volts-amperes. The efficiency of this type of apparatus is normally over 90%. The primary may be supplied directly with ordinary line current under voltage somewhere between 120 and 220 and the proportion of turns in primary and secondary is such that, in the neighborhood of the crucible the difference in potential is on the order of a volt. A single turn secondary is illustrated. The intensity of current which passes through the crucible may thus be several hundreds of amperes and even more than 1000.

In order to initiate the drawing, a cold glass rod is applied to the glass pellicle which appears at the end of the spout, they adhere, and the glass can be drawn down as a fiber or rod and gripped between the rollers 32, 33 of the drawing mechanism. The electrical motor is started and drawing begins. If the fiber as originally drawn is not of the precise diameter desired, the diameter can be changed by regulating the temperature of the crucible and the speed of the drawing apparatus. If the fiber is too thin, it can be increased in diameter by slowing the speed of drawing, or by reducing the crucible temperature or both. If the fiber is too thick it can be thinned by increasing the speed of drawing, by raising the temperature of the crucible, or both. It is easier, when it is satisfactory, to change the speed because there is a greater time lag in altering the temperature of the crucible.

When the drawing conditions are such that the fiber has the desired characteristics of diameter and regularity, the operator draws off one or more lengths adapted for the intended use. Usually these are limited to a length of 30 cm. for most test pieces.

These test fibers are subjected to those tests for which they are intended such as resistance to traction, measurement of the modulus of elasticity, chemical resistance, electrical resistance, viscosity, and determination of the various "points" which are involved in glass making.

The foregoing example gives the figures necessary for the drawing of glass fibers of uniform diameter. The same principles, but other temperatures or speeds, would be involved in, for instance, the drawing of organic thermoplastics. However, for such things the proper conditions are readily determined in accord with what has been herein set forth.

In the preferred form of the invention, the heating transformer is electrically fed from the sector through a transformer or autotransformer 16 which has continuous control of the secondary voltage; this apparatus is preferably of toric type which provides great facility of regulation. The speed controller gives a very accurate and very constant speed of the drawing roller even at very low speeds, for example .5 to 4 turns per minute regulatable to one in a thousand. The Acloque apparatus has this capacity.

The glass fibers must be wholly free from bubbles and from devitrification, therefore the "point" or temperature at which bubbles tend to reform in the glass constitutes an upper limit and the "point" or temperature of devitrification constitutes a lower limit for the crucible. The platinum bar is adjustable in the forked blocks so as to center the axis of the spout perfectly on a line tangent to the drawing roller at the point of pull. In operation the crucible is truly vertical, the bar 5, 6 is truly horizontal, and the lower orifice of the spout is perfectly horizontal and perfectly circular.

An accessory not shown in the drawings constitutes a cap for the crucible which helps in reducing heat losses from the top of the molten mass and to regulate and regularize the temperature.

As examples the following tables indicate the drawing speeds and the fiber diameters obtained for two glasses of different compositions and for a thermoplastic material corresponding to different temperatures of drawing:

(a) Borate glass

| Temperatures, °C. | Drawing speed, m./m. per sec. | Fiber diameter, m./m. |
|---|---|---|
| 1,150 | 2.4 | 0.880 |
| 1,225 | 2.4 | 0.850 |
| 1,150 | 4.00 | 0.710 |
| 1,225 | 4.7 | 0.670 |

(b) Ordinary glass for the production of plate glass

| Temperatures, °C. | Drawing speed, m./m. per sec. | Fiber diameter, m./m. |
|---|---|---|
| 1,060 | 4.00 | 0.600 |
| 960 | 4.7 | 0.600 |

The temperatures were measured by means of an optical pyrometer placed on the platinum crucible without correction of the emissive power of the platinum.

(c) Polyamide derived from amino-acid 11—Undecanoic

| Temperature, °C. | Drawing speed, m./m. per sec. | Fiber diameter, m./m. |
|---|---|---|
| 205 | 7.2 | 0.600 |

The temperature was measured with a thermocouple platinum platinum-rhodium soldered on the platinum crucible.

As many apparently widely different embodiments of the present invention may be made without departing from the spirit and scope thereof, it is to be understood that the invention is not limited to the specific embodiments.

What is claimed is:

1. Laboratory apparatus for the production of a filament of a thermoplastic material such as glass, said filament having a predetermined constant section along its length, said filament being adapted to be used in the laboratory determination of the physical and chemical characteristics, such as viscosity, tensile strength, and chemical resistance of the material, said apparatus comprising a small crucible, means for heating the crucible to and maintaining it at a precise predetermined temperature, a nozzle having an accurate circular discharge passage at the bottom of the crucible positioned so that its lower aperture is horizontal, a drawing device disposed beneath the nozzle, said drawing device comprising two parallel rollers adapted to grip the filament between them, means resiliently pressing the rollers toward each other, means for adjusting the axis of one roller in a horizontal direction transverse to the line of vertical movement of the filament from the nozzle and to move the other roller around the first said roller, whereby to bring the pass line between the rollers vertically beneath the nozzle, means for driving one of the rollers at a constant peripheral speed, and means shielding the filament in its passage from the nozzle to the rollers to protect it from uneven cooling by the atmosphere.

2. Apparatus as claimed in claim 1, wherein the means for heating and regulating the temperature of the crucible comprises a transformer having a primary and a secondary, the secondary of the transformer being composed of a single loop, a portion of such loop being a horizontal bar, the crucible is secured to the bar so as to form a portion of the loop through which current in the secondary of the transformer passes, means to vary the voltage of the current input to the primary of the transformer, means to measure the temperature of the crucible, and means to measure the electrical power supplied to the primary of the transformer.

3. Apparatus as claimed in claim 2, wherein the horizontal portion of the secondary loop of the transformer is made of platinum, and the crucible is made of platinum and is secured to such horizontal portion of the loop.

4. Apparatus as claimed in claim 1, wherein the means to adjust the drawing means to bring it vertically below the nozzle comprises a vertically disposed plate, means on the plate journalling the first roller, means mounting the plate for pivoting about an axis normal to the general extent of the plate and substantially spaced from the axis of the first roller whereby the plate may be rotated to bring the periphery of the first roller into tangential alignment with the vertical axis of the nozzle, and means mounting the second roller on the plate so that the axis of such second roller may be adjusted about the axis of the first roller.

5. Apparatus as claimed in claim 1, wherein the first and second rollers are rubber-covered.

6. Apparatus for the production of a filament of a thermoplastic material, such as glass, having a predetermined constant section along its length, a said filament being adapted to be used in the laboratory determination of the physical and chemical characteristics, such as viscosity, tensile strength, and chemical resistance of the material, said apparatus comprising a small crucible exposed to the atmosphere, a horizontal plate supporting the crucible to heat the crucible to an accurately controlled temperature, the bottom of the crucible being provided with a calibrated outlet having a vertically disposed circular passage therethrough for the vertical discharge of the material in the form of a cylindrical filament, and drawing means accurately disposed beneath said orifice, said drawing means comprising a first driven roller, means for driving said first roller at constant peripheral speed, a second roller cooperating with the first roller for engaging the filament therebetween and drawing it from the orifice, means to support the first roller and to adjust the position of its axis to bring the periphery of such roller into tangential alignment with the vertical axis of the orifice, and means to rotate the axis of the first roller so as to bring the plane containing the axes of the first and second rollers perpendicular to the vertical axis of the orifice.

7. Laboratory apparatus for the production of a filament of a thermoplastic material such as glass, said filament having a predetermined constant section along its length, said filament being adapted to be used in the laboratory determination of the physical and chemical characteristics, such as viscosity, tensile strength, and chemical resistance of the material, said apparatus comprising a small crucible, means for heating the crucible to and maintaining it at a precise predetermined temperature, a nozzle having an accurate circular discharge passage at the bottom of the crucible positioned so that its lower aperture is horizontal, a drawing device disposed beneath the nozzle, said drawing device comprising two parallel rollers adapted to grip the filament between them, means resiliently pressing the rollers toward each other, means for adjusting the axis of one roller in a horizontal direction transverse to the line of vertical movement of the filament from the nozzle and to move the other roller around the first said roller, whereby to bring the pass line between the rollers vertically beneath the nozzle, and means for driving one of the rollers at a constant peripheral speed.

8. Laboratory apparatus for the production of a filament of a thermoplastic material such as glass, said filament having a predetermined constant section along its length, said filament being adapted to be used in the laboratory determination of the physical and chemical characteristics, such as viscosity, tensile strength, and chemical resistance of the material, said apparatus comprising a small crucible, means for heating the crucible to and maintaining it at a precise predetermined temperature, a nozzle having an accurate circular discharge passage at the bottom of the crucible positioned so that its lower aperture is horizontal, a drawing device disposed beneath the nozzle, said drawing device comprising two parallel rollers adapted to grip the filament between them, means resiliently pressing the rollers toward each other, means for adjusting the axis of one roller in a horizontal direction transverse to the line of vertical movement of the filament from the nozzle, whereby to bring the pass line between the rollers vertically beneath the nozzle, means for driving one of the rollers at a constant peripheral speed, and means shielding the filament in its passage from the nozzle to the rollers to protect it from uneven cooling by the atmosphere.

9. Apparatus as claimed in claim 8, wherein the means for heating and regulating the temperature of the crucible comprises a transformer having a primary and a secondary, the secondary of the transformer being composed of a single loop, a portion of such loop being a horizontal bar, the crucible being secured to the bar so as to form a portion of the loop through which the current in the secondary of the transformer passes.

10. Apparatus according to claim 7, wherein the heating means for the crucible is electrically powered, comprising means to control the electrical heating means for the crucible, and a housing having a front panel which encloses at least a part of the said electrical heating means and a part of the means to control the electrical heating means, and wherein the crucible and the drawing device are mounted on the front face of the front panel of the housing.

11. Apparatus according to claim 10 in which the crucible is provided with two opposite bars acting as supporting means and electrically heating elements for said crucible.

12. Apparatus according to claim 10 comprising removable means mounted on the panel between the crucible and the drawing device for shielding the filament in its passage from the nozzle of the crucible to the rollers to protect it from uneven cooling.

References Cited in the file of this patent

UNITED STATES PATENTS

| | | |
|---|---|---|
| 1,427,014 | Von Pazsiczky | Aug. 22, 1922 |
| 2,489,243 | Stalego | Nov. 22, 1949 |
| 2,495,956 | Cook | Jan. 31, 1950 |
| 2,540,415 | Altman | Feb. 6, 1951 |
| 2,658,848 | Labino | Nov. 10, 1953 |
| 2,821,744 | Spohn et al. | Feb. 4, 1958 |
| 2,908,036 | Russell | Oct. 13, 1959 |

FOREIGN PATENTS

| | | |
|---|---|---|
| 478,334 | Great Britain | Apr. 8, 1936 |